United States Patent
Govindan et al.

(10) Patent No.: US 10,268,665 B2
(45) Date of Patent: Apr. 23, 2019

(54) SYSTEM AND METHOD TO DISPLAY DATA DEFINING OPERATION OF A VALVE ASSEMBLY ON A TREND GRAPH ON A USER INTERFACE

(71) Applicant: Dresser, Inc., Addison, TX (US)

(72) Inventors: Vidya Govindan, San Ramon, CA (US); Sudhakar Reddy, San Ramon, CA (US); Urvashi Sahni, San Ramon, CA (US); Aditi Shete, San Ramon, CA (US)

(73) Assignee: Dresser, LLC, Addison, TX (US)

( * ) Notice: Subject to any disclaimer, the term of this patent is extended or adjusted under 35 U.S.C. 154(b) by 354 days.

(21) Appl. No.: 14/638,833

(22) Filed: Mar. 4, 2015

(65) Prior Publication Data
US 2015/0286614 A1     Oct. 8, 2015

Related U.S. Application Data

(60) Provisional application No. 61/976,272, filed on Apr. 7, 2014.

(51) Int. Cl.
*G05D 7/06*      (2006.01)
*G05B 15/02*      (2006.01)
(Continued)

(52) U.S. Cl.
CPC ......... *G06F 17/2247* (2013.01); *G05B 15/02* (2013.01); *G05D 7/0635* (2013.01);
(Continued)

(58) Field of Classification Search
CPC ....... G06F 17/22; G06F 17/30; H04L 12/801; H04L 29/08; H04L 12/26
See application file for complete search history.

(56) References Cited

U.S. PATENT DOCUMENTS

| 5,329,465 | A | 7/1994 | Arcella et al. |
| 6,345,382 | B1 * | 2/2002 | Hughes ................ G06F 8/24 717/100 |

(Continued)

FOREIGN PATENT DOCUMENTS

JP     02011204264 A     10/2011

OTHER PUBLICATIONS

Wikipedia, Apr. 2, 2014, https://en.wikipedia.org/w/index.php?title=Multitier_architecture&oldid=602367596, (wikipedia.pdf), pp. 1-4.*
(Continued)

*Primary Examiner* — Asher D Kells
(74) *Attorney, Agent, or Firm* — Paul Frank + Collins P.C.

(57) ABSTRACT

A system and a method to display diagnostic and operating data on a trend graph via a web browser so that the data appears to trend in real-time. In one embodiment, the system includes a server with an architecture having multiple layers. The layers include a pair of first in, first out (FIFO) data queues including a first data queue and a second data queue. The embodiments utilize a timing structure with a plurality of timers including a first timer to regulate calls from the first data queue to a data source (e.g., a valve assembly or controller on a distributed control system), a second timer to regulate calls from the second data queue to the first data queue, and a third timer to regulate calls from the web browser to the second data queue for data to display on trend graph.

19 Claims, 5 Drawing Sheets

(51) Int. Cl.
*G06F 16/22* (2019.01)
*G06F 17/22* (2006.01)
*G06F 9/451* (2018.01)
*H04L 12/26* (2006.01)
*H04L 29/08* (2006.01)
*H04L 12/801* (2013.01)

(52) U.S. Cl.
CPC ............. *G06F 9/451* (2018.02); *G06F 16/22* (2019.01); *H04L 43/045* (2013.01); *H04L 43/0876* (2013.01); *H04L 47/19* (2013.01); *H04L 67/02* (2013.01); *H04L 67/325* (2013.01)

(56) References Cited

U.S. PATENT DOCUMENTS

| | | |
|---|---|---|
| 7,089,086 B2 | 8/2006 | Schoonover |
| 7,680,546 B2 | 3/2010 | Gilbert et al. |
| 7,702,409 B2 | 4/2010 | Lucas et al. |
| 7,971,151 B2 | 6/2011 | Nixon et al. |
| 8,060,834 B2 | 11/2011 | Lucas et al. |
| 8,185,219 B2 | 5/2012 | Gilbert et al. |
| 2007/0132779 A1* | 6/2007 | Gilbert .................. G06F 9/4488 345/619 |
| 2007/0234290 A1* | 10/2007 | Ronen ...................... G06F 8/36 717/120 |
| 2008/0027704 A1* | 1/2008 | Kephart ........... G05B 19/41885 703/22 |
| 2008/0049641 A1* | 2/2008 | Edwards ................. H04L 12/66 370/253 |
| 2008/0052632 A1* | 2/2008 | Thibault .......... G05B 19/41835 715/748 |
| 2008/0109090 A1* | 5/2008 | Esmaili .................. G05B 17/02 700/29 |
| 2009/0198648 A1* | 8/2009 | Middleton ........ G06F 17/30398 |
| 2009/0210814 A1* | 8/2009 | Agrusa .............. G05B 23/0267 715/772 |
| 2011/0288786 A1* | 11/2011 | Blevins .................. G05B 17/02 702/22 |
| 2012/0296448 A1* | 11/2012 | Balentine ........... G05B 19/0426 700/19 |
| 2013/0131844 A1 | 5/2013 | Campney et al. |
| 2014/0277604 A1* | 9/2014 | Nixon ............... G06F 15/17331 700/47 |
| 2014/0282195 A1* | 9/2014 | Nixon ................ G05B 23/0216 715/771 |
| 2015/0309702 A1* | 10/2015 | Butler ................... G06F 9/4443 715/771 |
| 2016/0103433 A1* | 4/2016 | Sahni .................... G06F 3/0484 700/83 |
| 2016/0275628 A1* | 9/2016 | Mishra .................. G06Q 50/04 |

OTHER PUBLICATIONS

International Search Report and Written Opinion issued in connection with corresponding PCT application No. PCT/US2015/019343 dated Jun. 19, 2015.

Ecava Sdn. Bhd., "User Guide—Ecava IntegraXor 4.00", Ecava Sdn. Bhd. User Guides Feb. 8, 2013, pp. 1-182, retrieved from Internet: URL:http://www.integraxor.com/doc/ug/pdf, retrieved on Mar. 3, 2013.

Anonymous: "Multitier architecture—Wikipedia, the free encyclopedia", Apr. 2, 2015, pp. 1-4, retrieved from the internet: URL:http://en.wikipedia.org/w/index.php?title=Multitier_architecture&oldid=602367596, retrieved on Jun. 10, 2015.

Sangyong Han; Web based rSPC (real-time statistical process control) system supporting XML protocol.

* cited by examiner

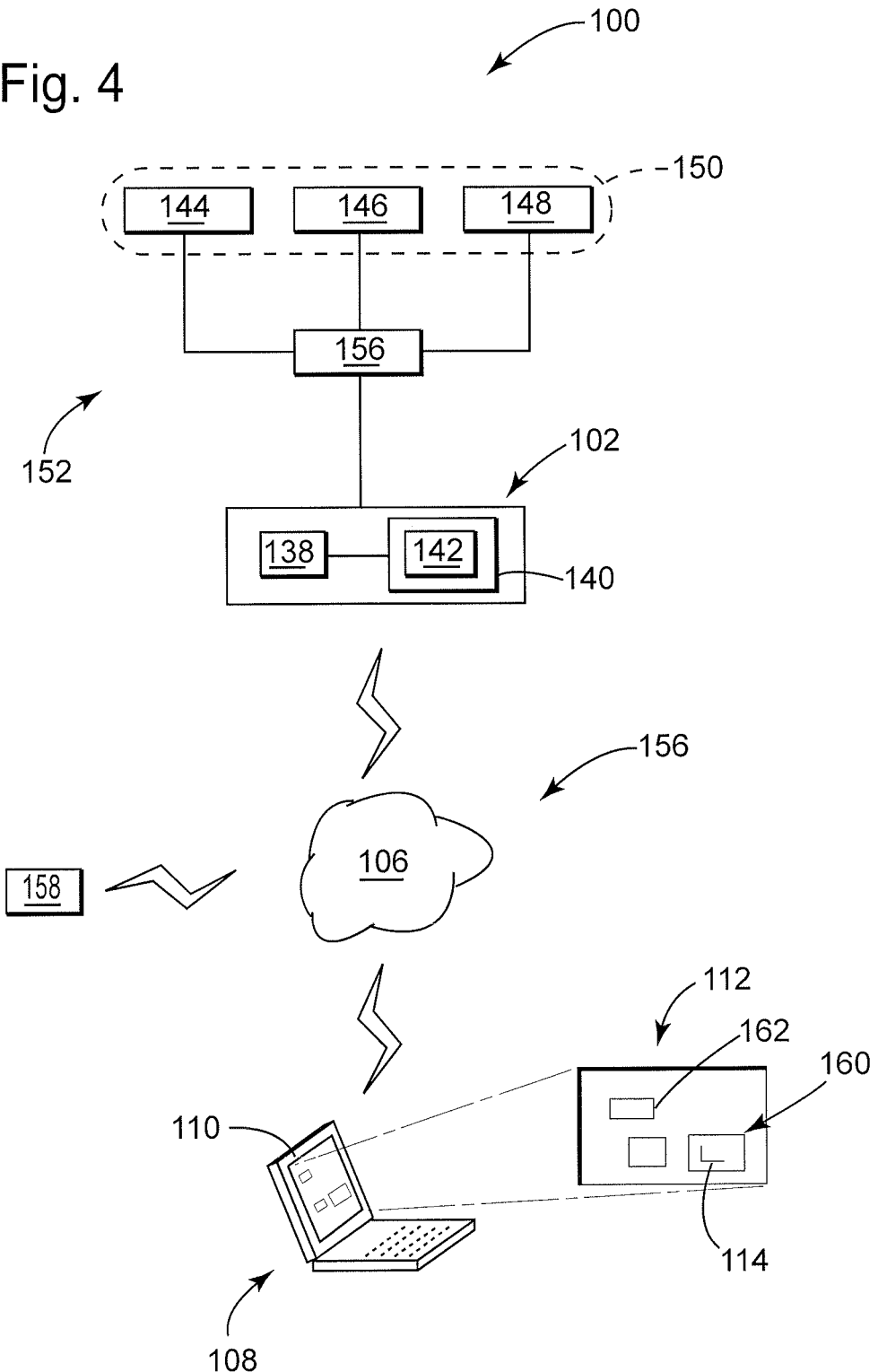

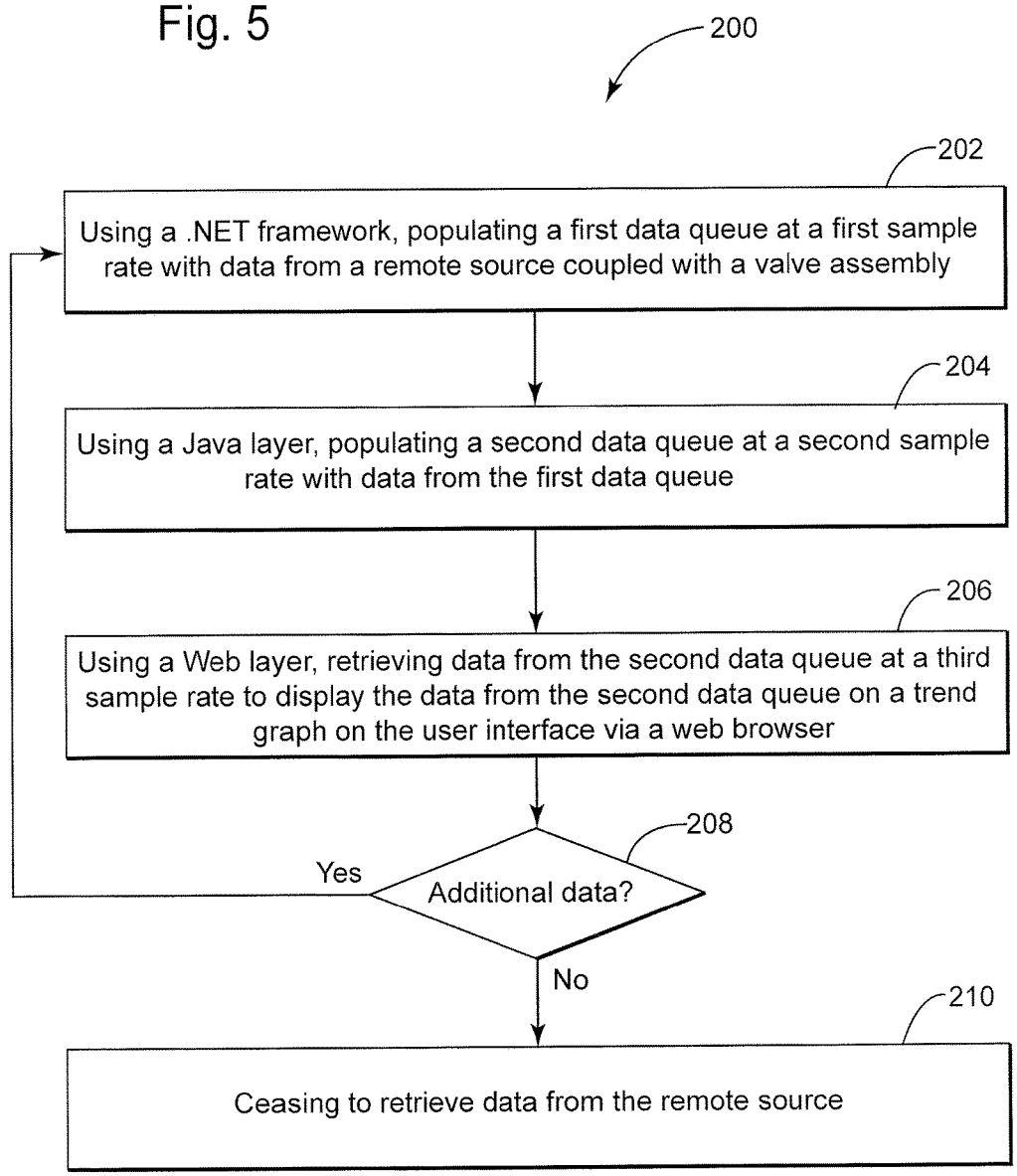

SYSTEM AND METHOD TO DISPLAY DATA DEFINING OPERATION OF A VALVE ASSEMBLY ON A TREND GRAPH ON A USER INTERFACE

CROSS-REFERENCE TO RELATED APPLICATIONS

This application claims the benefit of priority to U.S. Provisional Application Ser. No. 61/976,272, filed on Apr. 7, 2014, and entitled "METHOD AND SYSTEM TO DISPLAY DATA ON A USER INTERFACE." The content of this application is incorporated herein by reference in its entirety.

BACKGROUND

The subject matter disclosed herein relates to process control systems and device diagnostics, with particular discussion about a method and system architecture to provide data to a user interface to support trend analysis and display in real-time.

Process lines may include many varieties of flow controls. These process lines typically transfer fluids for use in the chemical industry, refining industry, oil & gas recovery industry, and the like. Examples of the flow controls include pneumatic and electronic valve assemblies (collectively, "valve assemblies") that regulate a flow of process fluid (e.g., gas and liquid). In conventional implementation, these valve assemblies have a number of components that work together to regulate flow of process fluid into and/or out of the process line. The components include a closure member, a seat, a valve stem, and an actuator. Examples of the closure member may embody a plug, ball, butterfly valve, and/or like implement that can contact the seat to prevent flow. In common constructions, the actuator couples with the closure member (via the valve stem). The valve assembly may also incorporate a valve positioner with electrical and/or electro-pneumatic components. During operation, the valve positioner receives control signals from a controller that is part of a process control system (also "distributed control system" or "DCS system"). These control signals define operating parameters for the valve assembly, namely, a position for the closure member relative to the seat. In response to the control signal, the valve positioner delivers a pneumatic signal that regulates instrument gas to pressurize the actuator in order to regulate this position.

Problems with valve assemblies on the process line may disrupt the process and/or prevent the process line from achieving the necessary process parameters. The resulting disruptions can lower yields and reduce quality. In large refineries, chemical plants, and power plants, disruptions can also lead to significant expense from process downtime that is necessary to troubleshoot and repair the problematic devices. Plant operators therefore have an interest to perform diagnostics on the valve assemblies to detect problems at the device-level, for example, before problems manifest in ways that can hinder sustainable operation of the process line. These diagnostics can leverage tools that present information to the plant operators. These tools include software packages that process and display the data, typically to a user interface that displays on a computer or a workstation. In this manner, an end user can observe the user interface to evaluate operation of the process devices.

Notably, advances in technology that relate to data transmission, data storage, and data processing allow plant owners and operators to monitor performance of devices at a very granular level. By implementing appropriate analysis, plant owners and operators can often predict with great accuracy the potential for failure in a singular device before problems can occur and disrupt operation of a plant or a process line. Such foresight is critical for the plant operator to make judgments about maintenance and repair schedules, to reduce labor costs, and to maintain efficient operation of the plant or process line.

Conventional tools that allow the plant operator to perform device diagnostics have not kept pace with expanding amounts of data that is available for analysis. Many conventional tools have interfaces that complicate access to the wealth of information that is available to the individuals that are responsible for oversight of the facility. These interfaces may require multiple interactions (or "clicks") from the end user simply to drill down into the data at the device-level. Moreover, the tools often rely on antiquated approaches that tether access by the end user to a single point or location, e.g., a desktop computer.

For process and control industries, these approaches do not exploit other modalities the end user might use to view and interact with the information. But failure to leverage wired and wireless technologies and related devices (e.g., smart phones, tablets, etc.) forego much efficiency that would help the plant operator operate the plant more efficiently. Exemplary technologies include server-client systems that enable web-based interfaces using a web browser (and related technology) and a server that can process data at the valve assembly-level and deliver the data to the web-based browser.

Migration of display requirements to web-based user interfaces has exposed some limitations in conventional tools. However, system architecture at the server can frustrate delivery of data to the web browser in a manner sufficient to enable the user interface to best situate the end user to diagnose problems of a specific or individual valve assembly on the process line. It has been found, for example, that varying data sampling rates, data exchange/communication rates, and data processing rates are rarely matched and synchronized as necessary to appropriately retrieve and process data from the valve assemblies and to smoothly display the data on the web-based user interface. The deficiencies often render the tools unable to convey "live" or real-time data to a browser; instead providing static displays with limited functionality.

BRIEF DESCRIPTION OF THE INVENTION

This disclosure describes embodiments of a system and a method to display diagnostic and operating data on a trend graph via a web browser so that the data appears to trend in real-time. These embodiments utilize a timing structure that coordinates data transfer across multiple layers of an architecture on a server. The layers implement a pair of first in, first out (FIFO) data queues. The data queues include a first data queue that receives data from one or more valve assemblies and/or a controller on the DCS system and a second data queue that receives data from the first data queue. The second data queue can also persist data to a database for use to determine certain performance indicators from the data. The timing structure defines a plurality of timers including a first timer to regulate calls from the first data queue to the data source, a second timer to regulate calls from the second data queue to the first data queue, and a third timer to regulate calls from the web browser to the second data queue. As noted more below, the timers can be configured to coordinate the sample rate of data shown on the trend graph with the sample rate of data that populates into the first data queue.

BRIEF DESCRIPTION OF THE DRAWINGS

Reference is now made briefly to the accompanying drawings, in which:

FIG. 4 depicts a schematic diagram of the system of FIGS. 1 and 3 integrated with a process control system featuring multiple process devices; and FIG. 5 depicts a flow diagram of a computer-implemented method for providing diagnostic data that relates to operation of a valve assembly for use on a user interface.

Figure 1:
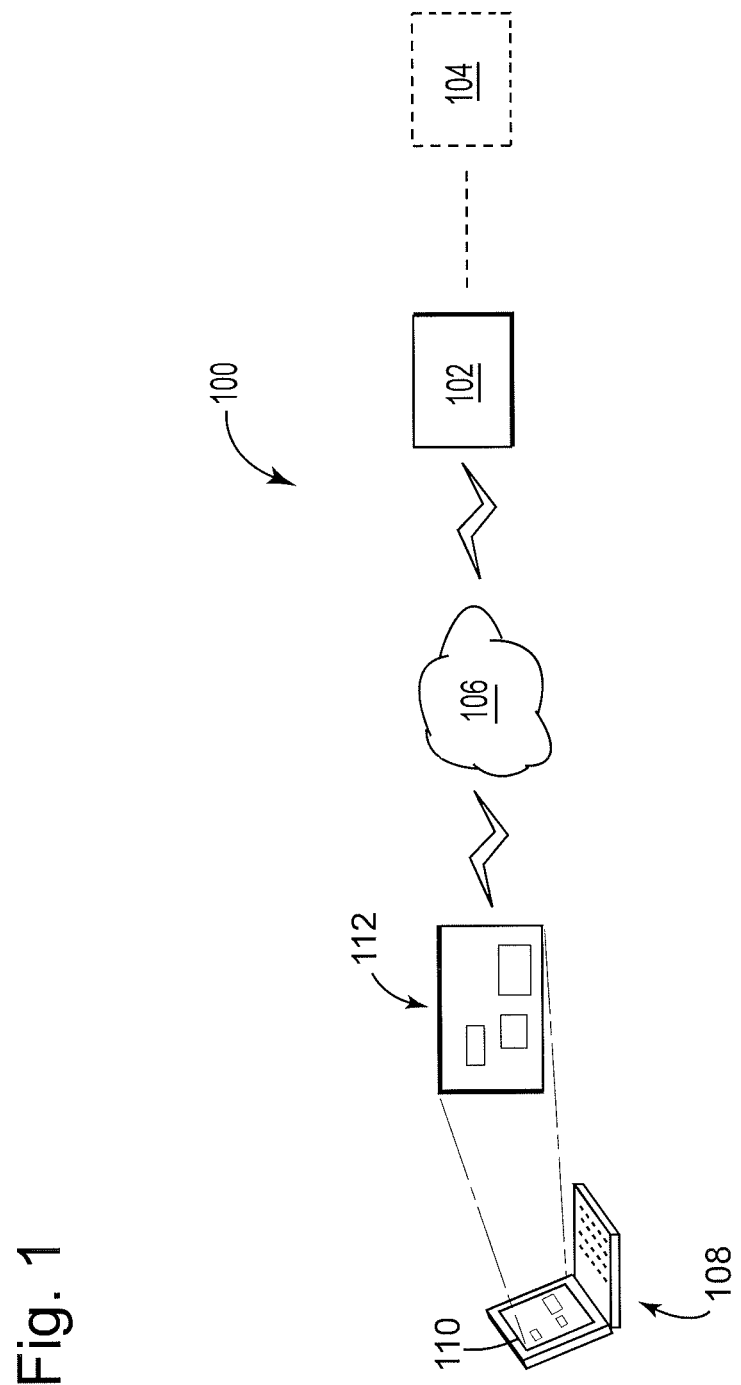
FIG. 1 depicts a schematic diagram of an exemplary embodiment of a system that is configured to deliver data to a user interface.

Where applicable like reference characters designate identical or corresponding components and units throughout the several views, which are not to scale unless otherwise indicated. Moreover, the embodiments disclosed herein may include elements that appear in one or more of the several views or in combinations of the several views.

DETAILED DESCRIPTION

The discussion below introduces systems with architecture that can deliver device data for display on a remote device using a web browser. The result is a rich, robust experience at the user interface for the end user. This experience can include charts and/or graphs ("trend graphs") that depict operating data to correspond with real-time operation of the process device. These trend graphs offer a visual representation of operating trends that is smooth and contiguous for any given process device.

FIG. 1 depicts a schematic diagram of an exemplary embodiment of a system 100 that facilitates delivery of diagnostic data to an end user in accordance with this new, improved user experience. Moving from right to left in the diagram, the system 100 includes a server 102 (also, "first computing device 102") that communicates with a data source 104, typically a DCS system that controls valve assemblies found on a process line or, more broadly, that has access to valve assemblies (whether for control or data capture) that are distributed across one or more process lines, factories, plants, and/or installations. The system 100 also has a network 106 that facilitates communication between the server 102 and a remote terminal 108 (also, "second computing device 108"). The remote terminal 108 has a display 110 that can display a user interface 112 for use by an end user to perform diagnostics on a process device. Examples of the remote terminal 108 include smartphones and tablets, as well as conventional computing devices (e.g., laptops, desktops, etc.).

In use, the system 100 is configured for the server 102 and the remote terminal 108 to operate in accordance with a client-server model to render trending data on the user interface 112. The remote terminal 108 can utilize a web browser or like application to facilitate display of this trending data on the user interface 112 on the display 110. In one implementation, the server 102 operates as a web server that, in response to requests or "calls" from the web browser, gathers data from the remote source 104 and delivers the gathered data (and/or derivatives thereof) for display on the user interface 112.

Figure 2:
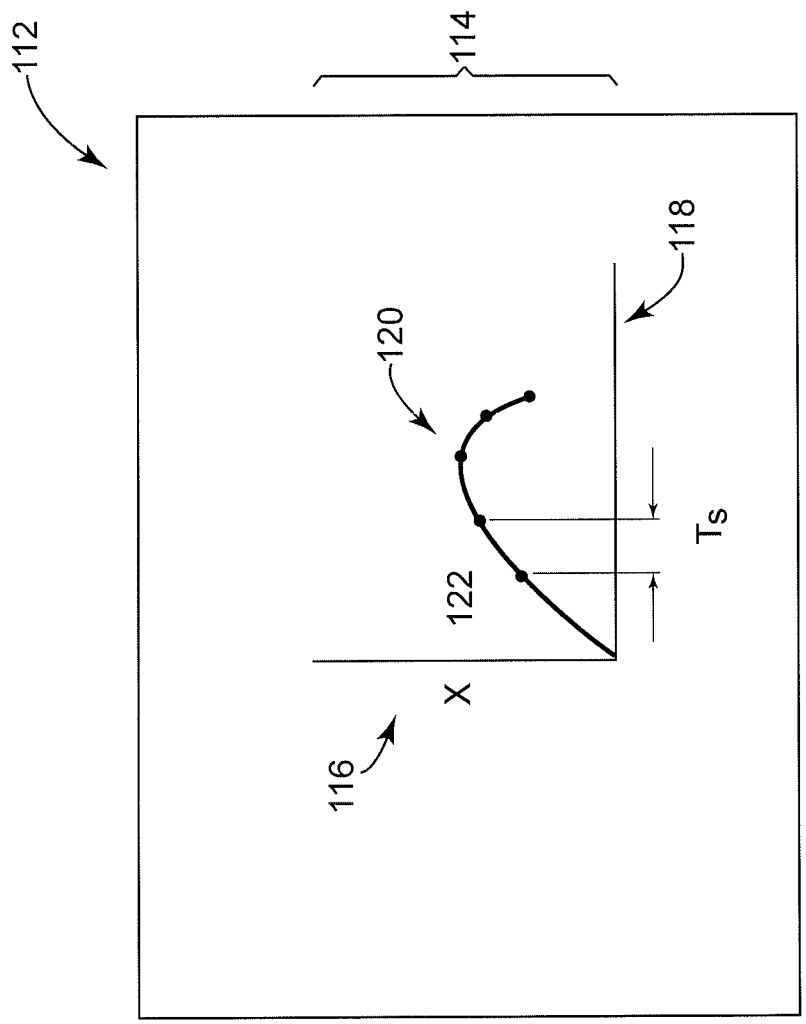
FIG. 2 depicts a schematic diagram of an example the user interface with a trend graph that is displayed using the system of FIG. 1.

FIG. 2 depicts a schematic diagram of an example of the user interface 112. This example includes a data plot 114 that defines values for an operating parameter 116 over a time scale 118. The data plot 114 includes a trend graph 120 (also "trend line 120") with a plurality of data points 122 separated by a sample time $T_s$. In use, the data points 122 update dynamically, thus causing the trend graph 120 to "move" over time from right to left with successive data points added to the trend graph 120 (at the right side) and removed from the trend graph 120 (at the left side). Examples of the trend graph 120 are useful for the end user to observe operation of the subject valve assembly in real-time. As noted herein, structural and functional aspects of the client-model model can frustrate delivery of data to the user interface 112 in order to appropriately distribute data to smoothly "move" across the trend graph 120.

With reference to FIGS. 1 and 2, at a high level, the server 102 is configured to facilitate display of the data from the remote source 104 as the moving, dynamic trend graph 120 on the user interface 112. This configuration employs an architecture with multiple, processing layers. This architecture typically is embodied by one or more executable instructions in the form of one or more software programs or software frameworks that enables the various layers on the server 102. As an improvement on conventional practice, however, the architecture is configured to regulate the timing of calls for data across and between the layers. This feature addresses issues, noted above, that tend to limit the useful, dynamic display of data via the web browser; namely, the features avoid problems with different rates for data sampling, data processing, and data exchange that are required to retrieve and process data in process control systems.

The timing structure of the architecture herein configures the server 102 to deliver data for display on the user interface 112 in a manner that appears to populate the trend graph 120 and like visual representations effectively in real-time. In turn, the trend graph 120 translates smoothly across the data plot 114. This feature creates a display that is visually pleasing and accurate with respect to the sample time $T_s$ for the data displayed on the user interface 112. This feature can also ease diagnosis of problematic conditions should they occur on the subject valve assembly because the delivery of data is coordinated with the sample time $T_s$ and, thus, coordinated with operation of the subject valve assembly. For industrial processes and process control systems, this feature is beneficial at least because the data shown on the moving trend graph 120 effectively corresponds with operation of the valve assemblies in real-time, thus rendering an experience for the end user to view and understand operation of one or more of the valve assemblies on the process line.

Figure 3:
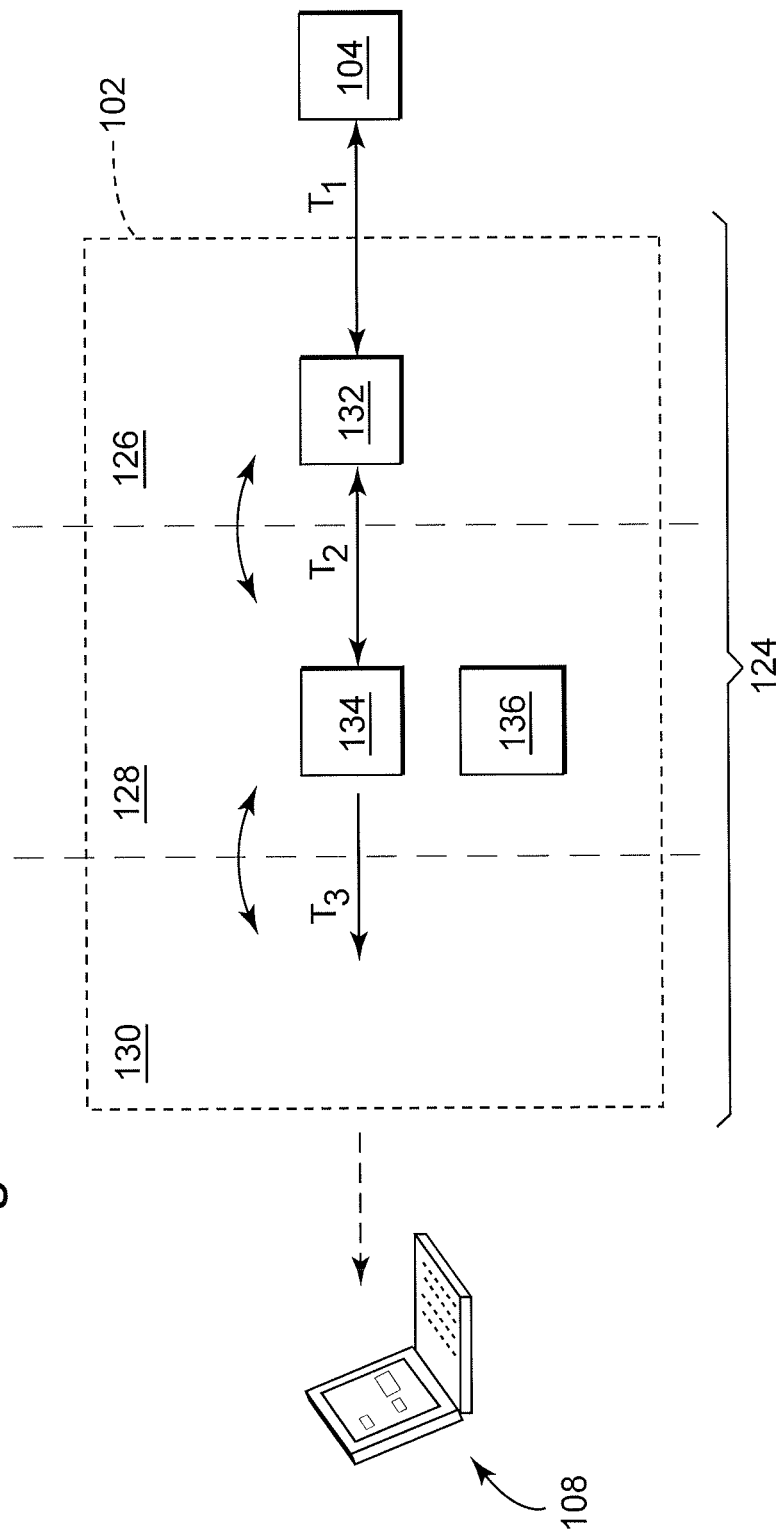
FIG. 3 depicts a schematic diagram of an example of the system of FIG. 1.

FIG. 3 illustrates a schematic diagram of an exemplary architecture of the server 102 (FIG. 1) that can facilitate dynamic display of data on the user interface 112 (FIGS. 1 and 2). The architecture is identified generally by the numeral 124. The architecture 124 includes a plurality of layers (e.g., a first layer 126, a second layer 128, and a third layer 130). Moving from right to left in FIG. 3, the first layer 126 includes a first data queue 132. The second layer 128 includes a second data queue 134 and a database 136. Collectively, the layers 126, 128, 130 configure the server 102 to deliver data from the data source 104 to the user interface 112 in response to calls from the web browser deployed on the remote terminal 108. The second layer 128 and the third layer 130 can form the web server to host the web browser in order to provide data for display on the user interface 112 of the remote terminal 108. In response to a call from the web browser, the first data queue 132 retrieves data from the remote source 104. The second data queue 134 retrieves data from the first data queue 132. In addition, the second data queue 134 can also persist (also "store" or "write") the data to the database 136. The web server retrieves the data from the second data queue 134 to transmit to the remote terminal 108. In the one example, the data queues 132, 134 can be configured as a first in, first out (FIFO) queues, wherein the first entry is the oldest and the last entry is the newest.

As also shown in FIG. 3, the architecture 124 incorporates a timing structure that coordinates the exchange of data to facilitate the dynamic, moving display of data on the user interface 112. This timing structure comprises a number of individual timers (e.g., a first timer T1, a second timer T2, and a third timer T3). These individual timers measure a time interval (also, "a rate" or "a sample rate") that defines the time between calls to retrieve data. In the present example, the first timer T1 measures the time interval between calls to the data source 104 for data to populate the first data queue 132. This time interval may correspond with the sample time $T_s$ between data points on the trend graph 120 (FIG. 2) that the user interface 112 displays on the remote terminal 104. The second timer T2 measures the time interval between calls to the first data queue 132 for data to populate the second data queue 134. The third timer T3 measures the time interval between calls by the web browser to the second data queue 134 for data for display on the remote terminal 108.

Examples of the timing structure typically embody one or more executable instructions that can provide some type of chronological indication of time. The server 102 can execute these executable instructions to modulate one or more other processes that acquire data and that prepare the data to transmit to the remote terminal 108. One or more of the timers T1, T2, T3 may be configurable to tune the flow of data with the hardware configuration of the system 100 to achieve the smooth display of the trend graph 120 (FIG. 2). In one example, the timer T1 is fixed to match the sample time $T_s$ on the trend graph 120 (FIG. 2).

The architecture 124 can be implemented using different coding languages. For example, the first layer 126 can be implemented using a .NET framework as developed by Microsoft®. The .NET layer 126 can communicate with the remote source 104 to retrieve data and to populate the retrieved data as entries in the first data queue 132. The second layer 128 can be implemented as a JAVA application, effectively leveraging JAVA language or one of its derivatives. The JAVA layer 128 communicates with the .NET layer 126 to retrieve data from the first data queue 132 and to populate the retrieved data as entries in the second data queue 134. In one implementation, the JAVA layer 128 is configured to persist (also "store" or "write") the retrieved data from the first data queue 132 to the database 136. Persisting the data from the second data queue 132 to the database 136 makes data available for use with one or more analysis algorithms that utilize the data to generate values, e.g., for one or more performance indicators. The third layer 130 (and the second layer 128 as applicable) can be implemented as the web server. The Web layer 128, 130 can host the web browser and, as noted above, can interact with the second data queue 134 to retrieve data and to transmit the data over the network 106 for display on the user interface 112. This disclosure does contemplate use of other software frameworks, however, one or more of which might work and function within the operations contemplated with the spirit of the discussion herein.

Turning also to FIG. 4, the server 102 can embody a computing device with a processor 138, a memory 140 that couples with the processor 138, and executable instructions 142 that are stored on the memory 140. The executable instructions 142 can comprise all or part of computer programs (e.g., software and firmware) and like compilations of instructions (collectively, "software") that are configured to be executed by the processor 138. As noted within the context of the present disclosure, the executable instructions 142 can enable the architecture 124 (FIG. 3) with functionality of the multiple layers 126, 128, 130 (FIG. 3) on the server 102, as well as to provide one or more of the data processing and manipulation functions contemplated herein.

In the illustrated embodiment, the system 100 can embody a control structure that manages operation of a plurality of devices (e.g., a first process device 144, a second process device 146, a third process device 148) on a process line 150. Each of the process devices 144, 146, 148 can embody individual valves, also referred to herein as "control valve assemblies" and/or "valve assemblies." The process line 150 can be found in a plant or a factory that service industries in the chemical, petrochemical, resource recovery and processing, and related fields of technology.

At a high level, the control structure includes a process structure 152 and a network structure 154 that are useful to manage operation of the valve assemblies 144, 146, 148 to modulate flow of process fluids through the process line 150. The process structure 152 can include a controller 156 and, where applicable, the server 102. The controller 156 operates as part of the DCS system to communicate control signal(s) to the valve assemblies 144, 146, 148. The control signal(s) causes the valve assemblies 144, 146, 148 to regulate the position of the closure member relative to the seat. As noted herein, the server 102 couples with the controller 156 to gather and process data and information about the valve assemblies 144, 146, 148. Such communication can leverage any type of protocol (e.g., HART, FOUNDATION® Fieldbus, etc.). The data typically reflects operating parameters (e.g., position, setpoint, and actuator pressure) for each of the individual valve assemblies 144, 146, 148 on the process line 150.

The network structure 154 can be configured to facilitate data transmission between the server 102 and the remote terminal 108. The network structure 154 can include the network 106 as configured for wired and/or wireless communication. The network 106 couples with the remote terminal 108 and with one or more peripheral devices (e.g., an external server 158). The external server 158 may be configured to collect and store data, as well as to perform other peripheral functions, for example, to store software for use to distribute data to the server 102 and/or the remote terminal 108 for display on the user interface 112. As also shown in FIG. 4, the user interface 112 has various icons (e.g., a data display icon 160 and a selectable icon 162). An end user can utilize the icons 160, 162 of the user interface 112 to view data (e.g., through the data display icon 160 and/or data plot 114) and to instruct the server 102 to deliver data (e.g., through interaction with the selectable icon 162). For example, use of the selectable icon 162 may initiate acquisition of trend data for display on the trend graphs contemplated herein.

With reference to FIGS. 2, 3, and 4, in one implementation of the system 100, the web browser can initiate a first call (also, "START TREND") for data by selecting the selectable icon 162 at the remote device 108. The START TREND requests data that relates to operation of one or more of the valve assemblies 144, 146, 148 on the DCS system by address and/or protocol. The first layer 126 (FIG. 3) recognizes the START TREND call and the first timer T1 starts in order to regulate calls to populate the first data queue 132 with data from the controller 156 (or other component of the DCS system, including the valve assemblies 144, 146, 148). In one implementation, the second layer 128 and the third layer 130 await acknowledgement or a second call ("GET TREND DATA") of successful communication between the first layer 126 (or the first data queue 132) and the controller 156. Upon acknowledgement and/or the GET TREND DATA from the web browser, the second timer T2 starts in order to regulate calls to populate the second data queue 134 with data from the first data queue 132. The data in the second data queue 134 also persists to the database 136. The third timer T3 can also start in response to the acknowledgment and/or the GET TREND DATA, in order to regulate calls to retrieve data from the second data queue 134 to transmit to the user interface 112 via the web browser. Each call to the queues 132, 134 retrieves all of the data available, effectively emptying the respective queue 132, 134.

Data retrieval and transmission to the web browser continues until the web browser initiates a third call (also "STOP TREND") that terminates data collection or, in other examples, until certain conditions and/or criteria, also referred to as "stop events," indicate the query from the web browser (e.g., at step 102) The STOP TREND may correspond with these stop events. Examples of the stop event may indicate that the number of data samples collected (and/or delivered to the web browser) was satisfied and/or has reached the last data sample to satisfy the respective trending analysis. In other implementations, the stop event may correspond with the end user interacting with the user interface 112 to request that the system 100 stop collecting data.

Continuing with reference to FIGS. 2, 3, and 4, communication within the system 100 may leverage communication protocols and data formats that comport with web-based formats. These data formats may use uniform resource locators (URLs) and like web addresses and/or indicators in combination with hypertext transfer protocol (HTTP) to complete the requisite exchange of information from the first computing device the second computing device. For purposes of simplifying the calls and outputs between the server 102 and the remote terminal 108 as well as between the layers 126, 128, 130 the data formats may conform with representational state transfer ("REST") structure that can use HTTP requests to perform various communication operations that create data, update data, read data, and delete data. This structure offers a lightweight alternative to Remote Procedure Calls and Web Services (e.g., SOAP, WSDL, etc.), among other architectures that are used by conventional data exchange techniques, particularly with respect to diagnostic data from, or about, valve assemblies found on a process line. This lightweight structure simplifies the calls and data requests and outputs that are generated in response to the calls. Device diagnostics and related data management for valve assemblies can benefit from this structure because the HTTP requests significantly reduce the coding and other tasks necessary to implement the REST structure for use with diagnostic data (e.g., data that relates to process devices like valve assemblies 144, 146, 148).

FIG. 5 depicts a flow diagram of a method 200 that configures the server 102 to retrieve, package, and (when necessary) transmit data over a network to a remote terminal. The steps of the method 200 can be embodied by one or more executable instructions that are part of one or more computer-implemented methods (e.g., method 200) and/or programs found on a single computing device (e.g., the server 102) and/or a plurality or collection of computing devices (e.g., more than one of the server 102).

The method 200 includes, at step 202, using a .NET framework, populating a first data queue at a first sample rate with data from a remote source coupled with a valve assembly. The method 200 also includes, at step 204, using a Java layer, populating a second data queue at a second sample rate with data from the first data queue and, at step 206, using a Web layer, retrieving data from the second data queue at a third sample rate to display the data from the second data queue on a trend graph on the user interface via a web browser. The method 200 further includes, at step 208, determining whether to retrieve additional data. If affirmative, the method 200 continues to include, at step 202, populating the first data queue. On the other hand, if all data has been collected, the method 200 continues to include, at step 210, ceasing to retrieve data from the remote source.

With reference also to FIGS. 1 and 4 above, the method 200 can configure operation of the server 102 to perform one or more processes that facilitate display of data on a trend graph (e.g., trend graph 120 of FIG. 2) using the web browser. The server 102 can operate to aggregate and process data and information. In certain industries, the server 102 or where applicable, multiple servers 102, may couple with one or more control systems (noted above as the "DCS system") that manage operation of valve assemblies 144, 146, 148. Such server(s) can access data that relates to each of the valve assemblies 144, 146, 148, which may be found on the process line 150, on multiple process lines in a factory (or facility or plant), as well as in use across numerous locations of a particular company and/or a particular entity.

In one embodiment, the method 200 may include one or more steps for receiving a query that will initiate the processes contemplated herein. The query may originate from one or more of the remote terminal 108 (e.g., a smartphone, tablet, laptop, etc.). At a high level, the query operates as the request, or "call," for data and/or information. The end user may initiate this call, e.g., by interaction with the remote terminal 108 to select icons and/or other selectable areas. In the discussion below, if not identified, it can be assumed that one or more embodiments of the method 200 can be configured to assimilate any interaction of the end user with the user interface with the query. The method 200, in turn, configures the server to process and respond to the call, often by performing processes (including one or more of the steps of method 200) that generate data for use to configure the user interface on the web browser.

At step 202, the method 200 configures the server 102 to populate the first data queue with data. This step may occur in response to the query, i.e., the end user selects the START TREND or related icon on the user interface 112. The data may reside on a separate repository (e.g., a memory, a database, etc.), which in turn may couple and/or integrate with the DCS server. Examples of the repositories may include entries that associate the individual valve assembly with operating settings (e.g., setpoint, position, pressure, etc.) and like data that may be useful to portray operation of the individual valve assembly to the end user. In some implementations, the server 102 can interface directly with the controller 156 on the DCS system to retrieve the data, either from the controller 156 or directly from one or more of the valve assemblies 144, 146, 148 that couple with the controller 156.

At step 204, the method 200 configures the server 102 to populate the second data queue. This step may require acknowledgement from the .NET framework that the first data queue has been able to get data, e.g., from the controller 156. In one embodiment, the method 200 may also configure the server 102 to persist the data to a database and to process the data in the database (or the respective data queue). Such steps may include steps for calculating a value for a performance indicator. Examples of the performance indicator include friction, spring range, lag, stick-slip, and like parameters that can, in one example, be mathematically calculated from the operating variables discussed herein.

At step 206, the method 200 configures the server 102 to retrieve data from the second data queue for display in the trend graph. The method 200 may also configure the server 102 to generate an output that can convey the data, via the web browser, for display on the user interface. The data can include the operating data and, in some examples, values for the performance indicators, as desired. This step(s) can include steps for packaging the data in appropriate formats, one or more of which may be discussed herein. In one embodiment, the method 200 may also configure the server 102 to transmit the output to the network. This step facilitates delivery of the output over the network to the remote terminal 108, typically in the format that the web browser can utilize to generate the user interface. As noted herein, the data can configure the user interface among a variety of configurations. Each of the configurations may serve a unique purpose, for example, to allow the end user to visualize and perform diagnostics on a specific, individual valve assembly. This feature is beneficial for the end user as it provides the end user with a robust, mobile diagnostic tool that is not effectively tethered to the conventional practice or conventional modalities, i.e., the desktop computer.

At step 208 and step 210, the method 200 configures the server 102 to regulate the extent of data promulgated to the first data queue and, ultimately, displayed on the trend graph. As noted herein, the number of data points often correspond to a particular data or sample range, nominally defined by parameters. Such parameters may, for example, identify a specific number of data points. In other implementations, the number of data points may correspond with certain instructions, e.g., the STOP TREND, that indicate that no additional data is required for use on the trend graph (or other processes collateral thereto).

In view of the foregoing, the embodiments are configured to deliver data to a user interface using an architecture with multiple layers. The embodiments utilize a timing structure that regulates calls between layers of the architecture. The time interval is configured to accommodate for differences (or a deviation) between sample rates for the different layers of the architecture. A technical effect is to formulate a display of data on the user interface (in a trend graphs) that appears to populate in real-time, or near real-time, wherein the data can represent operation of one or more valve assemblies, e.g., on a process line.

One or more of the steps of the methods can be coded as one or more executable instructions (e.g., hardware, firmware, software, software programs, etc.). These executable instructions can be part of a computer-implemented method and/or program, which can be executed by a processor and/or processing device. The processor may be configured to execute these executable instructions, as well as to process inputs and to generate outputs, as set forth herein.

For example, the software can run on the valve assembly, any related control device and/or diagnostics server, and/or as software, application, or other aggregation of executable instructions on a separate computer, tablet, laptop, smart phone, wearable device, and like computing device. These devices can display the user interface (also, a "graphical user interface") that allows the end user to interact with the software to view and input information and data as contemplated herein.

The computing components (e.g., memory and processor) can embody hardware that incorporates with other hardware (e.g., circuitry) to form a unitary and/or monolithic unit devised to execute computer programs and/or executable instructions (e.g., in the form of firmware and software). Exemplary circuits of this type include discrete elements such as resistors, transistors, diodes, switches, and capacitors. Examples of a processor include microprocessors and other logic devices such as field programmable gate arrays ("FPGAs") and application specific integrated circuits ("ASICs"). Memory includes volatile and non-volatile memory and can store executable instructions in the form of and/or including software (or firmware) instructions and configuration settings. Although all of the discrete elements, circuits, and devices function individually in a manner that is generally understood by those artisans that have ordinary skill in the electrical and software arts, it is their combination and integration into functional analog and/or digital and/or electrical groups and circuits that generally provide for the concepts that are disclosed and described herein.

Aspects of the present disclosure may be embodied as a system, method, or computer program product. The embodiments may take the form of an entirely hardware embodiment, an entirely software embodiment (including firmware, software, etc.) or an embodiment combining software and hardware aspects that may all generally be referred to herein as a "circuit," "module" or "system." The computer program product may embody one or more non-transitory computer readable medium(s) having computer readable program code embodied thereon.

In one embodiment, this disclosure contemplates a non-transitory computer readable medium comprising executable instructions stored thereon. Broadly, these instructions can embody one or more of the steps of the method 200, and its variants and embodiments, as noted herein. In one example, the executable instructions can comprise instructions for receiving a query over a network from a web browser launched on a second computing device; starting, in response to the query, to retrieve data from a remote source coupled with a valve assembly; initializing a timer that measures a time interval, wherein the time interval is configured to accommodate for a deviation between a first sample rate and a second sample rate, at least one of which defines a rate at which data is collected and stored in a data queue from the remote source; operating the timer to count down the time interval; retrieving data from the data queue in response to expiration of the time interval; and generating an output that includes the data from the data queue for display on the web-based browser.

Computer program code for carrying out operations for aspects of the present invention may be written in any combination of one or more programming languages, including an object oriented programming language and conventional procedural programming languages. Program code embodied on a computer readable medium may be transmitted using any appropriate medium, including but not limited to wireless, wireline, optical fiber cable, RF, etc., or any suitable combination of the foregoing.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computing device, comprising:
   a processor;
   a memory coupled with the processor; and
   executable instructions stored on the memory and configured to be executed by the processor, the executable instructions comprising instructions for implementing a system architecture with a plurality of layers and a timing structure that regulates calls for data, the plurality of layers comprising a first layer configured to communicate with a process controller on a distributed control system, a second layer configured to communicate with the first layer, and a third layer configured to communicate with the second layer to form a web server that hosts a web browser for use to display data on a remote terminal via a user interface,
   wherein the timing structure is configured with a first timer, a second timer, and a third timer, the first timer starting in response to a first call for data and the second timer and the third timer starting in response to a second call for data that is different from the first call for data, so as to regulate data transfer from the process controller to the remote terminal so that the calls for data from the first layer to the process controller provide a continuous feed of data that reflects contemporaneous operation of a valve assembly on a process line that is visualized as a trend graph that moves across part of a display on the user interface via the web browser, and
   wherein the first timer measures a time interval between calls to retrieve data from the process controller, the second timer measures the time interval between calls to retrieve data from the first layer to the second layer, and the third timer measures the time interval between calls by the web browser to retrieve data from the second layer, and wherein the time interval of the first timer is different from the time interval of the second timer and the third timer.

2. The computing device of claim 1, wherein the first layer is configured with a first data queue, and wherein the timing structure regulates calls to populate data from the process controller into the first data queue.

3. The computing device of claim 2, wherein the second layer is configured with a second data queue, and wherein the timing structure is configured to regulate calls to populate data from the first data queue into the second data queue.

4. The computing device of claim 3, wherein the second layer is configured to persist data from the second data queue to a database.

5. The computing device of claim 4, wherein the second layer is configured to calculate a value for a performance indicator for one or more valve assemblies from the data in the database.

6. The computing device of claim 3, wherein the timing structure is configured to regulate calls by the web browser to retrieve data from the second data queue for use in an output that conveys the data to the user interface.

7. The computing device of claim 1, wherein the first layer comprises a .NET framework and the second layer comprises a JAVA application.

8. The computing device of claim 1, wherein the time interval of the first timer corresponds with a sample time between data samples on the trend graph.

9. The computing device of claim 1, wherein the time interval of the second timer is different from the time interval of the third timer.

10. A computing system, comprising:
    an architecture configured with:
      memory comprising,
        a first data queue that is configured to store data that relates to operation of a valve assembly, and
        a second data queue that is configured to store data from the first data queue, and
      executable instructions stored on memory, the executable instruction comprising instructions for implementing,
        a web server that is configured to host a web browser, and
        a timing structure configured with a first timer, a second timer, and a third timer the first timer starting in response to a first call for data and the second timer and the third timer starting in response to a second call for data that is different from the first call for data, so as to regulate data transfer into the first data queue, between the first data queue and the second data queue, and between the web server and the second data queue in order to provide a continuous feed of data that reflects contemporaneous operation of a valve assembly on a process line that is visualized as a trend graph that moves across part of a display on the user interface via the web browser, and
      wherein the first timer measures a time interval between calls to retrieve data from the process controller, the second timer measures the time interval between calls to retrieve data from the first layer to the second layer, and the third timer measures the time interval between calls by the web browser to retrieve data from the second layer, and wherein the time interval of the first timer is different from the time interval of the second timer and the third timer.

11. The computing system of claim 10, wherein the memory is further configured with a database that is configured to store data that corresponds with data in the second data queue.

12. The computing system of claim 10, wherein the timing structure comprises a first timer that measures a time interval to populate data into the first data queue, and wherein the time interval of the first timer corresponds with a sample time between data samples on the trend graph.

13. The computing system of claim 12, wherein the timing structure comprises a second timer that measures the time interval to populate data from the first data queue into the second data queue and a third timer that measures the timer interval for the web server to retrieve data from the second data queue, and wherein the time interval of the first timer is different from the timer interval of the second timer and the third timer.

14. A computer-implemented method for providing diagnostic data for use on a user interface, comprising:
   using a .NET framework, populating a first data queue at a first sample rate with data from a remote source coupled with a valve assembly;
   using a Java layer, populating a second data queue at a second sample rate with data from the first data queue; and
   using a Web layer, retrieving data from the second data queue at a third sample rate to display the data from the second data queue on a trend graph on the user interface via a web browser; and
   implementing a timing structure with a first timer, a second timer, and a third timer, the first timer starting in response to a first call for data and the second timer and the third timer starting in response to a second call for data that is different from the first call for data, so as to regulate calls for data between the first data queue, the second data queue, and the web browser to provide a continuous feed of data that reflects contemporaneous operation of a valve assembly on a process line that is visualized as the trend graph that moves across part of a display on the user interface, and
   wherein the first timer measures a time interval between calls to retrieve data from the process controller, the second timer measures the time interval between calls to retrieve data from the first layer to the second layer, and the third timer measures the time interval between calls by the web browser to retrieve data from the second layer, and wherein the time interval of the first timer is different from the time interval of the second timer and the third timer.

15. The computer-implemented method of claim 14, wherein the timing structure is configured so that data on the trend graph displays in accordance with a sample time between data samples on the trend graph that corresponds with the first sample rate.

16. The computer-implemented method of claim 14, wherein the first sample rate is different from the second sample rate and the third sample rate.

17. The computer-implemented method of claim 14, wherein the second sample rate is different from the third sample rate.

18. The computer-implemented method of claim 14, further comprising:
   using the Java layer, persisting data from the second data queue to a database.

19. The computer-implemented method of claim 18, further comprising:
   retrieving data from the database to calculate a value for a performance indicator.

* * * * *